US006987875B1

(12) United States Patent
Wallack

(10) Patent No.: US 6,987,875 B1
(45) Date of Patent: Jan. 17, 2006

(54) PROBE MARK INSPECTION METHOD AND APPARATUS

(75) Inventor: Aaron Wallack, Natick, MA (US)

(73) Assignee: Cognex Technology and Investment Corporation, Mt. View, CA (US)

( * ) Notice: Subject to any disclaimer, the term of this patent is extended or adjusted under 35 U.S.C. 154(b) by 451 days.

(21) Appl. No.: 10/032,168

(22) Filed: Dec. 21, 2001

Related U.S. Application Data

(60) Provisional application No. 60/292,779, filed on May 22, 2001.

(51) Int. Cl.
*G06K 9/00* (2006.01)

(52) U.S. Cl. .................. 382/146; 382/145; 382/147; 382/199; 348/125

(58) Field of Classification Search ............... 382/145, 382/146, 147, 141, 149, 173, 256, 257, 199, 382/204; 348/86–87, 125–126; 356/237.1
See application file for complete search history.

(56) References Cited

U.S. PATENT DOCUMENTS

| | | | |
|---|---|---|---|
| 4,396,903 A | 8/1983 | Habicht et al. | |
| 4,490,848 A | 12/1984 | Beall et al. | |
| 4,876,728 A | 10/1989 | Roth | |
| 5,179,419 A | 1/1993 | Palmquist et al. | |
| 5,214,712 A * | 5/1993 | Yamamoto et al. | 382/149 |
| 5,371,690 A | 12/1994 | Engel et al. | |
| 5,588,068 A | 12/1996 | Longest et al. | |
| 5,845,007 A | 12/1998 | Ohashi et al. | |
| 5,862,249 A | 1/1999 | Jang et al. | |
| 5,872,870 A | 2/1999 | Michael | |
| 5,917,935 A | 6/1999 | Hawthorne et al. | |
| 6,167,150 A | 12/2000 | Michael et al. | |
| 6,289,126 B1 * | 9/2001 | Ishisaka | 382/205 |
| 6,539,106 B1 | 3/2003 | Gallarda et al. | |

OTHER PUBLICATIONS

Gonzalez et al, Digital Image Processing, Addison-Wesley Publishing Company, 1993, p 524,540.*
Rafael C. Gonzalez and Richard E. Woods, *Edge Linking and Boundary Detection*, Digital Image Processing, Addison-Wesley Publishing Company, Sep., 1993.
Andrew Fitzgibbon, Maurizio Pilu and Robert B. Fisher, *Direct Least Spare Fitting of Ellipses*, IEEE Transactions on Patern Analysis and Machine Intelligence, vol. 21, No. 5, May 1999.
Andrew W. Fitzgibbon, Robert B. Fisher, *A Buyer's Guide to Conic Fitting*, British Machine Vision Conference, pp 513-522 (1995).
Robert M. Haralick and Linda G. Shapiro, *Computer and Robot Vision*, vol. 1, Binary Machine Vision, Addison-Wesley Publishing Company, 1992.
Ashok K. Agrawala and Ashok V. Kulkarni, *A Sequential Approach to the Extraction of Shape Features*, Computer Graphics and Image Processing 6, 538-557, Academic Press Inc., 1977.

(Continued)

*Primary Examiner*—Bhavesh M. Mehta
*Assistant Examiner*—John Strege
(74) *Attorney, Agent, or Firm*—Arthur J. O'Dea

(57) ABSTRACT

A method and apparatus for inspection of probe marks made on the interconnection lands of semiconductor devices using machine vision is disclosed. An image of an interconnection land is analyzed, and features of the image that may constitute indicia of probe marks are refined through the application of a series of unique heuristic processes. The output of the method is measurement data that can be used to characterize and verify the processes used to electrically probe semiconductor devices.

14 Claims, 7 Drawing Sheets

OTHER PUBLICATIONS

D. Geiger and A. Gupta and L.a. Costa, J. Vlontzos, Dynamic Programming for Detecting, Tracking, and Matching Deformable Contours, IEEE Transaction on Pattern Analysis and Machine Intelligence, Mar. 1995.

S.R. Gunn and M.S. Nixon, A Robust Snake Implementation; A Dual Active Contour, IEEE Transaction on Pattern Analysis and Machine Intelligene, Jan. 1997.

* cited by examiner

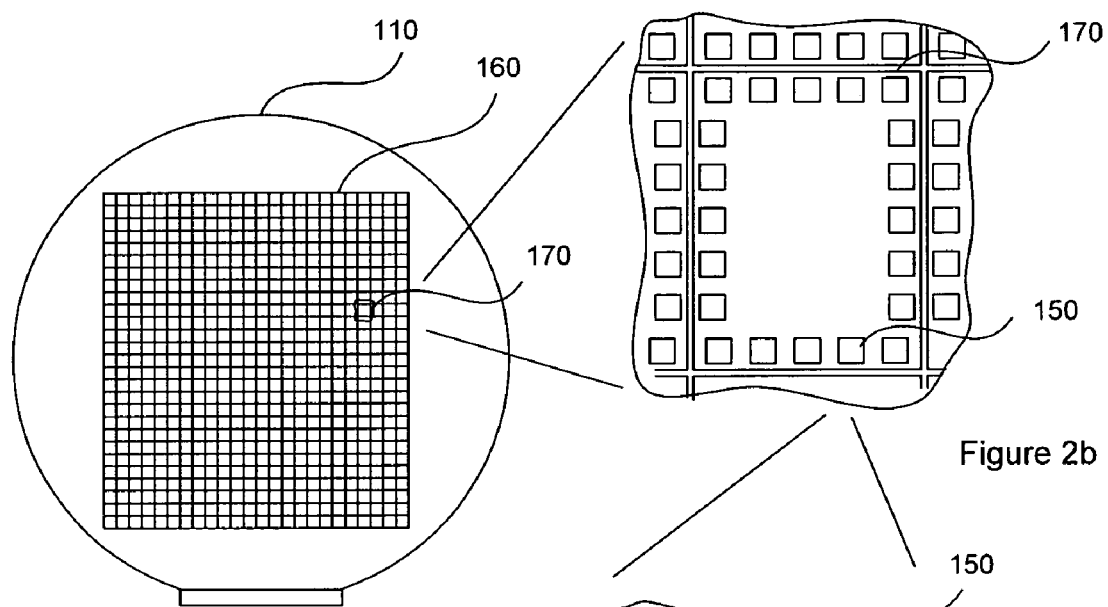
Figure 2a
Figure 2b
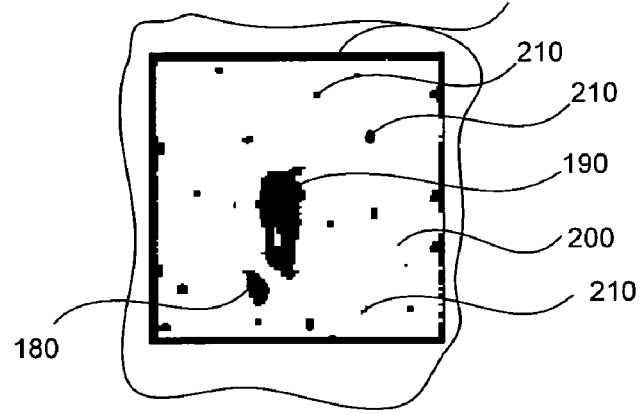
Figure 2c

PROBE MARK INSPECTION METHOD AND APPARATUS

CROSS-REFERENCE TO RELATED APPLICATIONS

This application claims priority to provisional application No. 60/292,779, filed in the U.S. Patent and Trademark Office on May 22, 2001, the contents of which are incorporated by reference. The present invention is related to my U.S. patent application Ser. No. 09/708,431, entitled "Object and Feature Detector System and Method" filed Nov. 9, 2000, now issued as U.S. Pat. No. 6,748,110.

BACKGROUND

The present invention relates to the application of machine vision algorithms in the manufacture of semiconductor devices. Specifically, the invention applies to the inspection of interconnection lands, or pads, of integrated circuits during fabrication, to ascertain that mechanical probe masks exist, indicating that an electrical test has been performed. The use of an inspection apparatus that can automatically detect and analyze probe masks on device lands can be more reliable and accurate than manual inspection with the human eye.

Silicon device fabrication involves various circuit definition steps with chemical processing of a wafer containing an array of multiple devices. An electrical test of the wafer is typically employed to identify defective devices and/or to perform process control. The electrical test is performed by probing the wafer with needle-tipped probes, leaving an indentation or surface finish aberration on the pad where the probe made contact with the pad. An inspection of the mark left by the electrical testing probe may be performed subsequent to the electrical test to visually assess the electrical testing operations. Absence of a mark, or misalignment of the mark on the pad, would indicate that the test was not properly performed. Additionally, data collected from a probe mark inspection may be useful in process characterization and process control of equipment alignment parameters.

Probe mark inspection is a useful operation in silicon device fabrication because of the increasing size, density, and value of the silicon wafers. Good devices must not be falsely identified as defective, whereas defective devices must be accurately identified so that needles processing and packaging effort is not further explained. Verification of the integrity of the electrical testing operation ensures that the devices are properly tested to avoid the cost penalties of false or improper indictment. Human visual inspection using a microphone is extremely tedious. Thus, the operation is ideally suited for a computer-assisted machine vision application.

Inspection of probe marks on device pads with a machine vision system is difficult because probe marks are relatively unstructured in appearance. A mark indicating acceptance evidence of a probe mark may present many different appearances in an image. Additionally, the pad image may contain features from surface imperfections of the pad that may confuse or obscure the interpretation or presence of a probe mark. Furthermore, particulate deposition on the device pads from the environment may appear similar to the image of a probe mark.

For the foregoing reasons, there is a need for a machine vision apparatus that can inspect silicon device pads on a wafer, and quickly and reliably assess the presence of a probe mark.

BRIEF SUMMARY OF THE INVENTION

The present invention is directed to a method and apparatus that satisfies the need for probe mark inspection. More specifically, a method and apparatus for quickly and reliably assessing the presence of a probe mark on a silicon device pad is presented. A machine vision system having a camera and machine vision processor is used to acquire and register an image of a silicon device pad under inspection. The machine vision system analyzes the image to detect a segmentation threshold and segment, or binarize the image data of the image. A list of dark regions can be generated from the binarized image data. Various heuristic refinements can be performed on the binarized image data and/or edge data detected in the image, corresponding to the list of dark regions. The heuristic refinement of features in the image results in modified characteristics of dark regions in the list of dark regions in the image.

Heuristic refinement may include pruning of protrusions or necks from segmented binary regions that result from the appearance of merging of pad surface imperfections or contamination to a probe mark in the image. Additionally, heuristic refinement may include pruning regions using a geometric mask that is essentially rolled along edge data corresponding to the region. Portions of the region that are not traversed by the geometric mask can be pruned. Further heuristics may include fitting ellipses to features in the image to prune portions of regions that do not form elliptical boundaries. Fuzzy math operations are employed so that results are repeatable.

The method and apparatus of the present invention can merge regions, and further apply heuristic refinement of the merged regions. Merged regions having closed edge chain regions that are treated special, are rescinded from special treatment once merged. Heuristic refinement of merged regions is performed to ensure that merged regions are in fact evidence of mechanical probing. Regions not deemed to indicate evidence of mechanical probing of a pad during electrical test of a silicon device are pruned from consideration. Characteristics of the refined regions in the image of the pad are returned as characteristics of a probe mark upon the completion of analysis.

BRIEF DESCRIPTION OF THE SEVERAL VIEWS OF THE DRAWING

The invention will be more fully understood from the following detailed description, in conjunction with the accompanying figures, wherein:

FIG. 2a is a plan view of a silicon wafer having an array of silicon devices.

FIG. 2b is a magnified view of a silicon device of FIG. 2a.

FIG. 2c is a magnified view of an interconnection land of the silicon device of FIG. 2b.

DETAILED DESCRIPTION OF THE INVENTION

While the present invention will hereinafter be described in connection with an exemplary embodiment thereof, it should be understood that it is not intended to limit the invention to that embodiment. On the contrary, it is intended to cover all alternatives, modifications and equivalents as may be included within the spirit and scope of the invention as defined by the appended claims.

For reference and clarification of the explanation of the exemplary embodiment of the invention, the term Heuristic is defined to be a method of solving a problem in which one tries each of several approaches or methods and evaluates the progress toward a solution after each attempt. The term "pixels" and "pels" are defined to be "picture elements," and are used interchangeably. Additionally, for clarification of the explanation of the exemplary embodiment of the invention, use of the term "elongation" as a reference to a vertical orientation is synonymous to the application of the term in a horizontal orientation. For example, an elongated vertical mark (length>width) is the same as an elongated horizontal mark (width>length).

Figure 1:
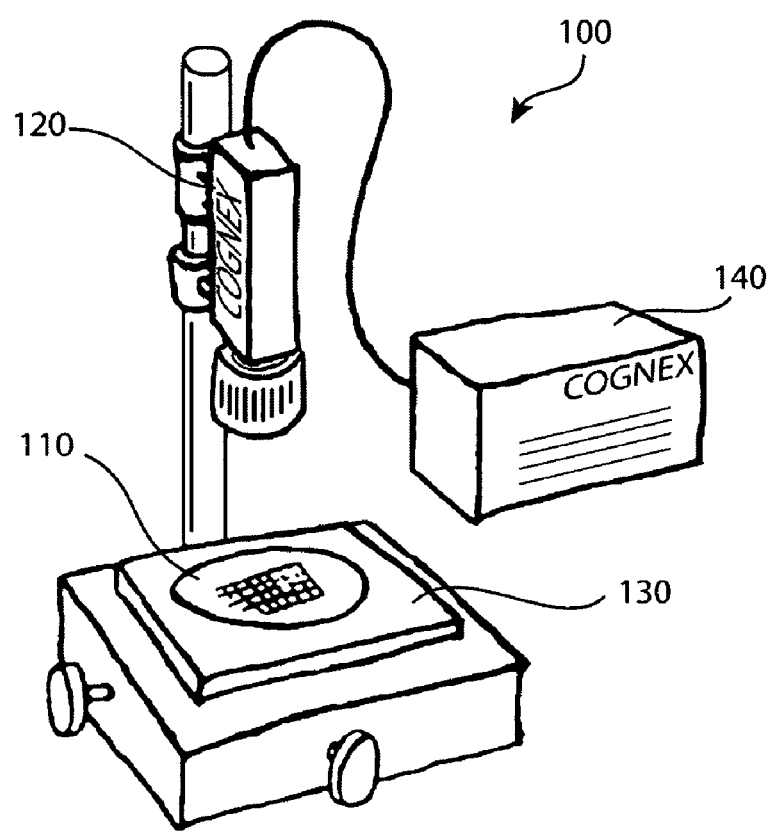
FIG. 1 is a perspective view of the exemplary embodiment of the present invention.

Referring to FIG. 1, in accordance with the present invention, an embodiment of the probe mark inspection apparatus of the invention 100 is shown. A silicon wafer 110 is presented to a camera 120 by an adjustable table 130. The camera 120 is coupled to a vision processing system 140 to analyze the image of the wafer 110 captured by the camera 120. An output of the vision processing system 140 is quantitative information relating to the presence and size of physical indicia of electrical testing on the silicon wafer 110. The adjustable table 130 permits the camera to sequentially capture an image of several magnified areas on the silicon wafer 110 to be analyzed by the vision processing system 140.

Referring to FIG. 2a, the silicon wafer 110 contains an array of silicon devices 160. FIG. 2b represents a magnified view of an individual silicon device 170 that is an element in the array of silicon devices 160 on silicon wafer 110. The silicon device 170 may contain a peripheral array of interconnection lands 150. These interconnection lands 150 provide means for an electrical interface to the silicon device 170, and may be physically probed in an electrical test during the fabrication of the silicon wafer 110. FIG. 2c represents a highly magnified view of an interconnection land 150. A probe mark 190 can be detected in the image of the pad surface 200 representing physical indicia of an electrical test. The image of the pad surface 200 may also contain pad surface imperfections 210, or pad surface contamination 180, that may obfuscate automated analysis of the image of the probe mark 190.

Figure 3:
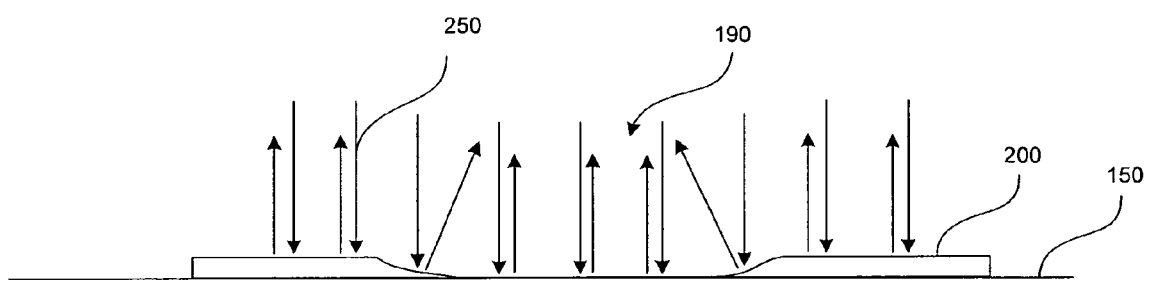
FIG. 3 is a cross-sectional depiction of a interconnection land illuminated with front-lighting.
Figure 4:
FIG. 4 is a depiction of probe mark images having bright central regions.

The probe mark 190 is impressed on the pad surface 200 during an electrical testing operation when the pad surface 200 is mechanically probed with a needle tipped or cantilevered probe. An aberration in the pad surface 200 results from the physical contact. An image of an interconnection land 150 illuminated with front-lighting will appear to have a bright pad surface 200 from the reflection of the front-lighting illumination. A probe mark 190 may have a darker appearance since the front-lighting illumination will be reflected away from the camera 120. FIG. 3 depicts a cross-section of a interconnection land 150 with a probe mark 190 represented as an indication in the pad surface 200. Light rays 250 reflect incident to the angle of the pad surface 200 and probe mark 190. FIG. 4 depicts several images of a probe marks 190 where the center of the probe mark 190 has a flat surface, resulting in an image of a dark probe mark with a bright center, as shown in FIG. 3.

Figure 5:
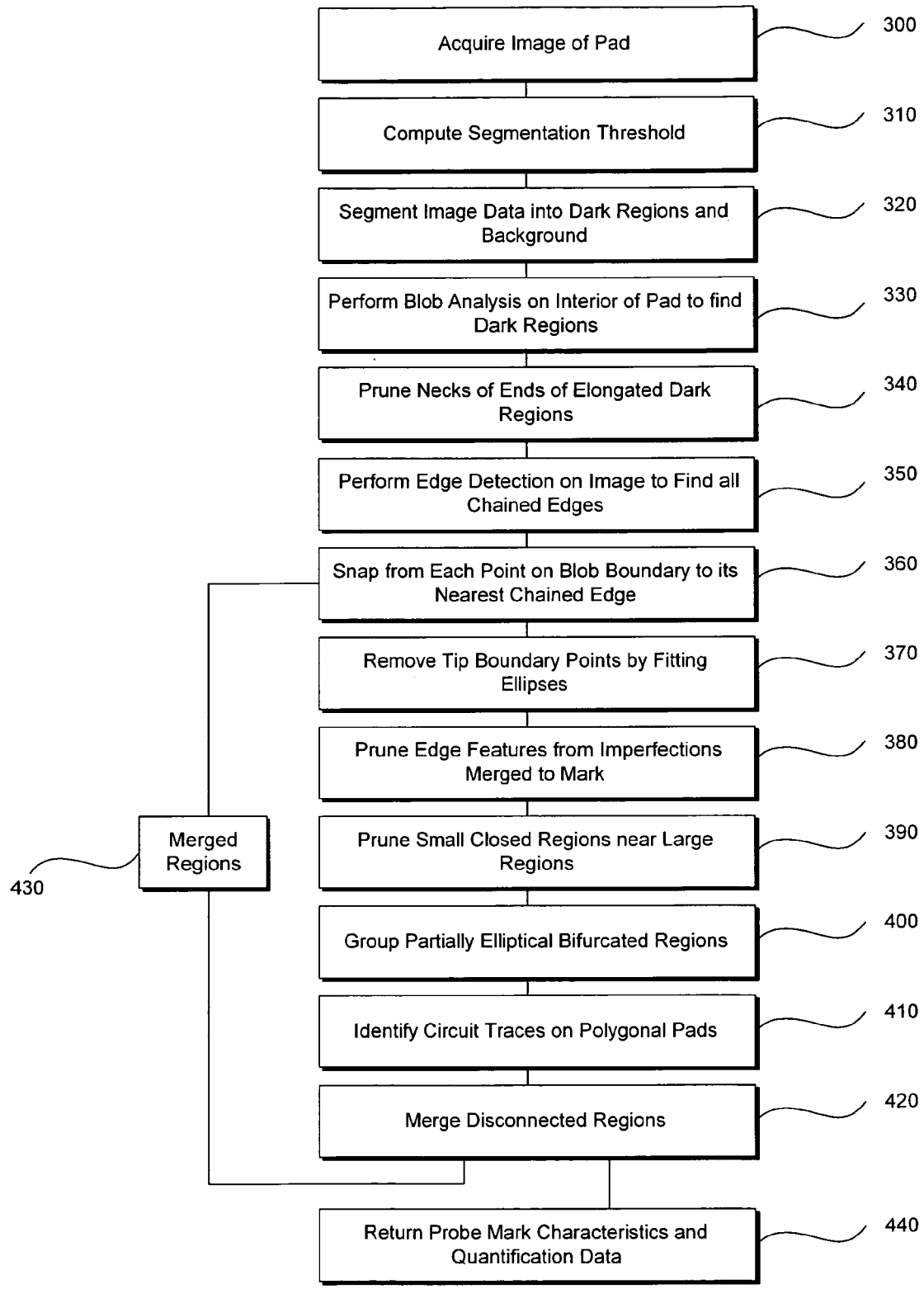
FIG. 5 is a flow chart illustrating the flow of operations performed according to an inspection method designed in accordance with the exemplary embodiment of the invention.

A method of performing probe mark inspection in accordance with the exemplary embodiment of the invention is illustrated in FIG. 5. According to the exemplary embodiment of the invention, a combination of blob analysis and edge detection is used to find and use a closed contour of edgelets to characterize the boundary of the probe mark 190. Additional heuristics are applied to further refine the detected probe mark 190, as hereinafter described.

As shown in FIG. 5, the method begins at an acquisition step 300 when an image of the pad to be inspected is acquired, e.g., using a camera 120 and probe mark inspection apparatus 100 illustrated in FIG. 1. Alternatively, the image data, or image acquired of a scene, may be pre-generated and stored in memory, which may be accessed at the acquisition step 300. The acquisition and registration step includes registration and masking of the pad, by searching the image for a trained model of the pad. Registration is necessary to ensure that only the pad surface is analyzed for probe mark evidence. Registration can be performed by using a four-degree of freedom search tool (x, y, angle, scale), such as PatMax, from Cognex Corporation. Deviation of the position of the silicon wafer 110 relative to the camera 120 may result in the appearance of the pad to be slightly rotated, which may be determined by registration. It may be necessary to rotate the image if the found pose includes too much rotation. If rotation of the found pose is negligible, subsequent processing can be performed on a rectangular sub-window of the image. Position differences between the transformed corners of the pad are used to determine if rotation is necessary, i.e., the difference between the model transformed by the found pad pose. If the pad corners differ from non-rotated positions by less than a threshold, e.g., three pixels, then the image does not require rotation. If the image does require rotation, then a high-precision affine transformation is used to generate an un-oriented image of the pad, such as Cognex Corporation's Affine Projection Tool.

A mask is generated to exclude features in the image not associated to the pad surface from further processing. For example, a non-rectangular pad may contain a dark border around the pad periphery, which may skew analysis if the border region is interpreted to be a probe mark. For non-rectangular pads, a mask is constructed once at training time, and used repeatedly at runtime, to improve runtime performance. Runtime masking or window operations are based upon the registered pad position.

Control then proceeds to a compute segmentation threshold step 310, at which segmentation threshold parameters are computed to differentiate between the pad surface 200 and the probe mark 190.

To compute the segmentation threshold in the segmentation threshold computation step 310, a user can manually input the segmentation parameters, or the method can automatically compute a binarizing segmentation threshold, such as by using within-group variance. A description of the application of within-group variance to establish a segmentation threshold in a greyscale image is described in Computer and Robot Vision, Volume I, by Robert M. Haralick and Linda G. Shapiro, Addison-Wesley (1992), pp. 20–23. An application of within-group variance will produce a histogram of greylevels on the pad, and choose an optimal threshold for separating the histogram into two distributions such that it minimizes the sum of the standard deviations (weighted by the number of contributors) of the two distributions. In the event that within-group variance fails to find a threshold—possibly because the pad has uniform grey values— then the median grey value of the pixels on the pad is used for the automatically computed segmentation threshold.

At a segment image data step 320, segmentation of the image data is performed on the acquired image data, that has been registered and masked, to distinguish dark regions from the background. Dark regions are pixels representing the probe mark 190, pad surface imperfections 210, and pad surface contamination 180, or other aberrations to the pad surface 200. Background regions are pixels representing the pad surface 200, or regions essentially perpendicular to the illumination source. A blob analysis step 360 follows with a blob analysis, using the blob tool available from Cognex Corporation's CVL machine vision library, on the interior of the pad to find and extract dark regions that exceed the minimum blob size threshold, and compute the location of the blob boundaries. The segmented image can be filtered to remove regions comprising one or more connected pixels less than a minimum blob size threshold. In the exemplary embodiment, the minimum blob size threshold, for example, can be set to 10 pixels.

Figure 6:
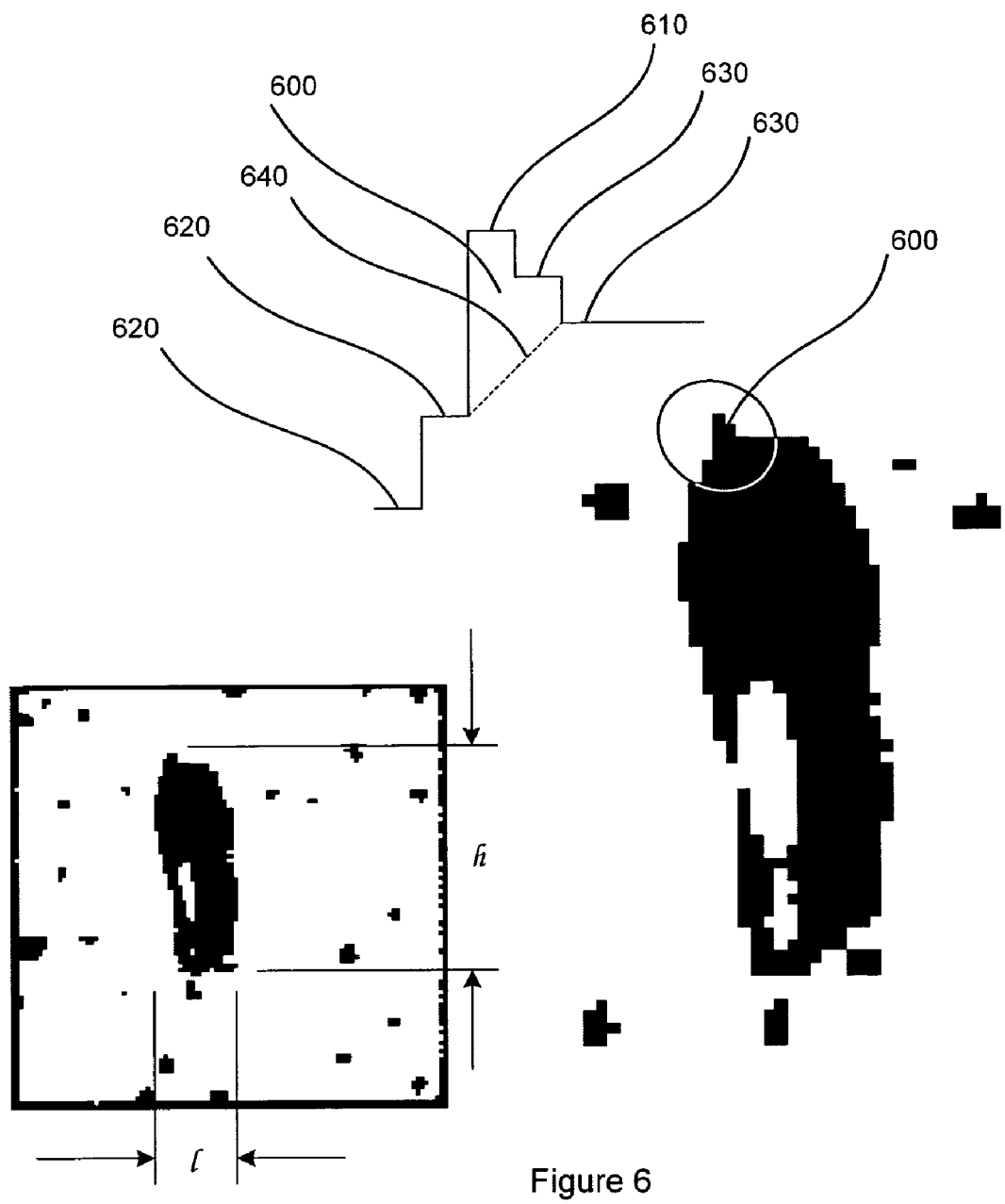
FIG. 6 is an illustration of image data produced in accordance with the exemplary embodiment of the invention.

A pruning step 340 is a heuristic to prune necks that may be detected on the ends of elongated blob boundaries. FIG. 6 is a representation of a segmented image that illustrates an example of the extension of a probe mark by a pad surface imperfection that resides at or near the extreme end of a probe mark 600. This additional feature, or neck, must be removed from the boundary so as to not unnecessarily extend the resulting bounding box dimension of the probe mark.

The pruning step 340 is directed only to the extreme ends of dark regions that are elongated, i.e., length (l)>width (w), as shown in FIG. 6. An elongation threshold filter may be applied wherein the pruning step 340 is only applied to sufficiently long elongated marks. Only dark regions having a length to width ratio exceeding an elongation threshold are analyzed, e.g., when the length of the mark exceeds the width by at least 7 pixels. Starting at each extremal point 610 (top and bottom of an elongated mark), boundary locations are detected that are previous locations 620 and successive locations 630 relative to the extremal point 610. For each previous location 620, a distance is measured to any successive location 630, represented as segment 640. Detection of additional previous locations 620 and successive locations 630 is repeated if the resulting segment 640 length dimension is less than a threshold value. In the preferred embodiment, a threshold of 3.0001 pixels has been employed. The segment having the furthest distance from the extremal point, i.e., the sum of the distances from the extremal point to the endpoints measured along the extremal direction, is used to prune the extension from the mark, with evenly spaced synthetic boundary points (space at most, 1 pixel apart) inserted at the segment, and the pruned sequence is removed from the blob boundary.

At an edge detection step 350, edge detection is performed on a portion of the image to find all chained edges. The preferred embodiment uses the edge detection/chaining tool from Cognex Corporation's CVL machine vision library. Standard edge detection techniques are applied to the bounding box, or region of interest, for each mark, to collect edge data. Detected edges that match expected edges, i.e., detected edges that have similar orientation and position as expected edges from the pad boundary, are ignored. Edge detection does not have to be limited to the segmented region; it can be applied to a portion of the region, or the entire image, or directed to a region of interest. The region of interest for edge detection may include a 2-pixel buffer around each segmented region. The edge detection parameters may include, for example, one or more magnitude and/or length thresholds, such as a minimum edge chain length. For example, a magnitude threshold would require all found edges to have magnitudes equal or exceeding a threshold of 20; a magnitude hysteresis threshold would require that one edge has at least a magnitude of 25; and a length threshold would require a minimum chain length of 8. The edge data is collected and then further processed to chain edges together. First, loose ends are identified, since more than two edges could join at a single point. Second, chains are separated into closed loops, while ignoring any chains contained inside any other closed chain. Additional edge detection and edge chaining concepts, commonly know to those in the art, may be applied, such as, for example, those described in "Computer Vision for Electronics Manufacturing", by L. F. Pau, page 233–242, published by Plenum Press, New York, 1990.

A chain length threshold may be ignored for short chains, which begin or end near edges of sufficiently long different chains and closed chains, and/or chains which begin or end near the boundary of the window where edge detection was performed. In other words, if the first or last edges of a short chain are sufficiently close to different chains that satisfy the minimum chain length criterion, the shorter nearby chains may be accepted, provided they satisfy the magnitude threshold, even though they do not satisfy the minimum chain length criterion. This can be implemented by validating chains in two steps. First, by enumerating sufficiently long chains, and second, accepting chains starting or ending near the long chains enumerated in the first step.

A heuristic snapping step 360 combines the output of the edge detection step 350 (detected and collected edge data in the region of interest, or bounding box, around each mark) with the pruned blob boundary data generated at the pruning step 340. This snapping step 360 is fully described in related application Ser. No. 09/708,431, incorporated herein by reference. The combination of edge and blob data snaps the edge data collected on the greyscale image to the blob boundaries of the segmented image. This may be done by substituting detected edge data, e.g., edgelets, for blob boundary data if the detected edge data is close enough to the blob boundary points. Each edge datum should retain information about which chain it was part of. This information is useful for determining which portions of the edgelet boundary (snapped from boundary locations) are part of the same chain. If there is no nearby edgelet, the blob boundary point is kept as a synthetic edgelet, the status of which is retained so that its origin is not associated with a chain.

The edge chains may be analyzed to determine if edgelets form the same chain may be substituted for edges snapped from the boundary locations. Alternate edge paths may be generated because of a vertex intersection of three chains. In such situations, the conventional edge detection technology and chaining algorithms can return anomalous results. These situations, where the edgelet boundary veers off from one chain to another can be detected by scanning down the edgelet boundary list and keeping track of the last edgelet on the boundary list corresponding to the same chain as the current edgelet. If the current edgelet is from the same chain as a previous edgelet (i.e., the most recent edgelet from the same chain), and the current edgelet's chain index (i.e., location on the chain) is only slightly greater than the previous edgelet's chain index, then a determination can be made to switch from the current snapped boundary sequence (between the current edgelet and the previous edgelet from the same chain along the snapped boundary) to the sequence of chain edgelets (between the current edgelet and the previous edgelet from the same chain along the chain) from the shared edge chain. Note that if the edge chain was closed, then wraparound is permitted when comparing the chain indices. A threshold value of 10 is suggested for comparing indices If such an alternate path is chosen, and the length of one of the subsets (either the boundary subsequence switched from, or the chains subsequence switched to) satisfies some criteria, then an additional edgelist corresponding to the boundary subsequence switched from may also be returned. The criteria that the subsequence must satisfy is either it must include a large number of edgelets (i.e., more than 40), or it must include a nominal number of edgelets (i.e., more than 20) having a nominal span (the Euclidean distance between the first and last edgelet in the subsequence greater than 6 pixels).

In determining whether to switch from the original snapped block boundary to the chain sequence, the measures of the sequences are considered. The following rules are executed, returning the consequence of the first rule that is satisfied. If the area between the two sequences is greater than some threshold (in this case, 30 square pels), a switch from the blob boundary to the chain is not performed. If the maximum distance from any edgelet in the blob boundary sequence to either the first or last edgelet in the blob boundary sequence is greater than a threshold (7 pels), a switch from the blob boundary to the chain is not performed. If the number of edgelets in the chain sequence is less than some fraction (e.g., ⅕th) of the number of edgelets in the blob boundary sequence, then a switch from the blob boundary to the chain is performed. If the average magnitude of the edgelets in the chain sequence is greater than a fraction (e.g., 1.2) of the average magnitude of the edgelets in the blob boundary sequence, then a switch to the chain is performed. If the average magnitude of the edgelets in the chain sequence is greater than a fraction (e.g., 0.5) of the average magnitude of the edgelets in the blob boundary sequence, then an average angular deviation of the two sequences is computed, and if the average angular deviation of the chain sequence is less than some fraction (0.5) of the average angular deviation of the blob boundary sequence, then a switch to the chain is performed. If none of these rules are satisfied, then a switch from the blob boundary sequence to the chain sequence is not performed.

A linear, time greedy algorithm is used to perform this chain-following functionality. Since this algorithm keeps track of the "last seen edgelet from the same chain," starting from the first edgelet in the list, opportunities can be missed if the targeted chain sequence wrapped around the end of the edge list. Consequently, the chain-following algorithm is run twice: first, using the original edge list; then the edgelist is cycled so that the middle element in the edge list becomes the first element (and the element after the middle element becomes the second), and the chain-following algorithm is run again.

Special consideration is made for "closed" edge chains, i.e., chains that fully encompass a region. For some closed chains, the blob boundary is ignored, and the entire closed chain may be considered to be a separate mark. If the area comprising the region encompassed by a closed chain is less than a threshold value (e.g., half the expected probe mark size), the blob boundary data is ignored, and the region is considered to be a separate mark. The closed chain region is ignored if the closed chain resides within another closed chain, and/or surrounds a bright region (as illustrated in FIG. 4). Additionally, any chains (open or closed) for which none of the edges correspond to a blob boundary are ignored.

The special consideration for closed chains may be rescinded under certain conditions, such that the closed regions are no longer treated as separate marks. First, a chain which has a significant gap may be no longer automatically considered a separate probe mark. A gap in a closed chain refers to a sequence of chain edgelets for which no blob boundary points were snapped to those edgelets. This condition will be found if a gap in the detected edge chains were significantly large, and if the gap is in the direction of the probe mark. Second, the location of the edge chains relative to the blob boundary may warrant a rescinding of the closed mark condition. If chained edges are detected only on the top and/or bottom of a blob boundary, and there is a gap (unmatched edges) such that the unmatched edges are above, below, left, or right of the entire blob boundary, then the closed chain condition may be rescinded, and the region no longer considered a separate mark. Additional conditions for the recission of the closed chain condition will be demonstrated in a merge step 420 hereunder.

An ellipse-fitting step 370 is a heuristic applied to the ends of elongated marks, that can be tested with (length>width*$f_{scale}$) where $f_{scale}$ is a scale factor e.g., 1.25. Additionally, the boundary must have a sufficient number of edges, e.g., 20, in order for this heuristic to be applied. If (length=width*$f_{scale}$), then a fuzzy score of 0.0 is applied to the pruning step. If (length>width*$f_{scale\ max}$), then a fuzzy score of 1.0 is applied to the pruning step, e.g., $f_{scale\ max}$ is 1.45. If (length/width) is between $f_{scale}$ and $f_{scale\ max}$, then $S_f$=(length/width)-$f_{scale}$/($f_{scalemax}$-$f_{scale}$) where $S_f$ is the fuzzy score.

The heuristic ellipse-fitting step 370 further refines the mark characteristics by fitting an ellipse to the tips of the blob boundaries and calculating the error from the extracted edges by using a least squares fit as described in Bookstein, F. L., "Fitting Conic Sections to Scattered Data", *Computer Graphics an Image Processing,* vol 9, no. 1, January, 1979, pp. 56–71, incorporated herein by reference. A first ellipse is fit to the top and bottom, or left and right, of the mark by increasing the edge set while calculating the error. Edgelets are incorporated into the sequence for which the ellipse is fit until the average ellipse fit error (total ellipse fit error divided by number of edgelets) exceeds a threshold (e.g., 0.4). Preceding and succeeding edgelets are alternatively considered for inclusion into the ellipse edgelet set for which the ellipse is fit. A weighted error is used which incorporates both the distance from the edgelet to the ellipse and the difference between the edgelet orientation and the orientation of the closest point on the ellipse. If the difference between the orientation is greater than 84 degrees, the error for that edgelet is infinite. Otherwise the error for the edgelet is the distance between the edgelet and the ellipse divided by the cosine of the angular differences between the edgelet and the closest point on the ellipse.

A second ellipse is then fit for a subset of edges to the left and right of the maximum horizontal position of the first ellipse edgelet set, and the error calculated. Four proceding edges and four succeeding edges are used to fit the second ellipse. Edges are not pruned if the area encompassed by the first ellipse set exceeds an area threshold, e.g., 20 square pixels.

Three special conditions exist under which edges are not pruned in the heuristic step 370. First, if the center of the first ellipse occurs near the center of the probe mark, as measured normal to the elongation axis of the probe mark, edges are not pruned. For this first condition, the test of whether the center of the probe mark is within the center of the first ellipse corresponds to whether the range between the first and last edgelet of the first ellipse completely contains a range of width 2 pels centered at the center of the probe mark (where the ranges are measured along a line normal to the probe mark's direction). Second, if any of the edgelets used to construct the first ellipse occur to the "left" or "right" of the first and last respective edgelets used to construct the first ellipse, then the pruning step is not performed. Note that under this second special condition "left" and "right" relative position refers to a position normal to the probe mark's elongation axis, and that the test for edgelet position must exceed the relative position by at least 0.5 pixels. Third, if the width between the first and last edgelets used construct the first ellipse (measured normal to the probe mark direction) is greater than ⅓ of the width of the probe mark, then edges are not pruned at heuristic step 370.

A third ellipse is fit with all the edges used for the ellipse and the second ellipse, and the error calculated. A comparison of the error calculated for the first, second, and third ellipses is then performed. If the total error (from fitting a single ellipse to the combined edgelets from the ellipse edgelet set and the second left/right edgelets) exceeds the sum of the errors from fitting two separate ellipses by an error threshold factor, e.g., 1.5, by the second ellipse, the edges that best fit the first ellipse are determined to define a pad surface imperfection, and the region is pruned. The fuzzy score $S_f$ is used so that only a portion of the region defined by the ellipse edgelets are possibly pruned. A synthetic edgelet is computed where the second ellipse would have peaked. If this synthetic edgelet is outside of the bounding box of the region, edges are not pruned. If the fuzzy score $S_f$ is 0.0, then no edges are pruned. If the fuzzy score $S_f$ is 1.0, then all of the edges in the first ellipse are pruned. If the fuzzy score $S_f$ is between 0.0 and 1.0, then we compute an interpolated positioned threshold wherein all edgelets "above" the threshold are pruned. For example, if the ellipse edgelet set is on the top of the mark, and the top most edgelet of the ellipse set has a y ordinate 52, and the bottom most edgelet has a y ordinate of 57, and the fuzzy score $S_f$ is 0.7, then edgelets in the ellipse edgelet set above (52*0.3) and (57*0.7) are pruned. If some edges were pruned and the synthetic edgelet is above that threshold, then the synthetic edgelet is incorporated into the region boundary.

Figure 7:
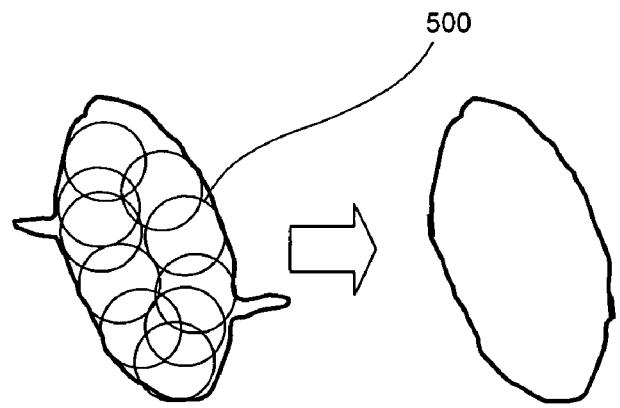
FIG. 7 is a representation of the step of pruning edge features from imperfections merged to the mark in accordance with the exemplary embodiment of the invention.

An edge feature pruning step 380 is a heuristic applied on elongated marks (i.e., length>width) of at least a certain size (e.g., length>20), that effectively prunes a pad surface imperfection 210 extending beyond the profile of a probe mark 190. The heuristic "rolls a circle" along the side boundary of each mark to limit the curvature of the region, as illustrated in FIG. 7. A geometric mask 500 such as a circle having a radius of 5 pixels is generated. A bounding box is computed for the edgelists corresponding to the region of interest by determining the rightmost/leftmost point for each vertical edge position on an edge chain. Adjacent points on the edgelists corresponding to the region of interest are connected with a straight line to form the edge chain. This heuristic can be efficiently implemented by computing intersection points between the boundary and a set of evenly spaced, axis-aligned parallel lines (the lines separated by exactly 1 pixel). This intersections between the boundary and the parallel lines can be efficiently computed by enumerating through all the pairs of adjacent edgelets and "looking up" which parallel line a particular pair intersects. It is necessary to note the "leftmost" and "rightmost" intersection along each parallel line. On the side of the mark, the circle, or geometric mask extremal position can be computed by considering the intersection along each neighborhood of 2×radius+1 lines (e.g., 11 lines; 5 below the center, and 5 above).

The geometric mask 500 is positioned tangentially to the edge chain, while incrementally positioned at each vertical edge location. The extremal horizontal position of the circular filter element 500 is then computed. This operation is performed twice; once for each side of the probe mark. When rolling the circle on the left side of the mark, the minimum horizontal position of the geometric mask 500 is computed. When rolling the circle on the right side of the mark, the maximum horizontal position of the geometric mask 500 is computed. Note that if the circle is rolled on a horizontal mar, the extremal vertical position of the geometric mask 500 would be computed.

A fuzzy threshold is applied in the heuristic edge feature pruning step 380 to limit the effect of pruning when the size of the mark is close to the threshold. Since this heuristic is applied only to the "long" boundary of an elongated mark, the effect of pruning must be tempered on a mark that approaches the threshold (i.e., too short). In the preferred embodiment, a determination of the region to which the heuristic edge feature pruning step 380 is applied can be computed from an ellipse which matches the inertia matrix of the boundary specified by the edges of a detected mark. For the purposes of this heuristic, the lengths of the sides correspond to the major and minor axes of the ellipse fit to the inertia matrix. For example, if the major axis of the ellipse fit to the inertia matrix is 25 pixels in length or greater, the region will receive the full effect of the pruning as determined in the heuristic edge feature pruning step 380. A fit ellipse having a length between 20 and 25 pixels will receive a diminished pruning effect according to a linear interpolation as determined by the aspect ratio of the fit ellipse. The region may be pruned by removing the portion of the blob boundary not captured by the incrementally positioned geometric mask 500, as modified according to the fuzzy threshold calculation. It has been shown that a maximum pruning effect of 4 pixels, for example, can be imposed to limit the amount by which the side dimensions are permitted to change.

In other words, if the fit ellipse length is less than or equal to 20, then a fuzzy score of 0.0 is applied to the pruning step. If fit ellipse length is greater than or equal to 25, then a fuzzy score of 1.0 is applied to the pruning step. If the fit ellipse length is between 20 and 25, then fuzzy_score=(fit ellipse length−20)/(25−20). That fuzzy score is then used to determine which edgelets are pruned based upon the results of the "rolling a circle" heuristic. If the fuzzy score is 0.0, then no edges are pruned. If the fuzzy score 1.0, then all of the edges identified by the "rolling a circle" heuristic are pruned. If the fuzzy score is between 0.0 and 1.0, then we compute an interpolated positional threshold wherein all edgelets "left of" (or respectively right of, above, or below) the threshold are pruned.

Small closed regions in close proximity to large regions may be pruned at a small feature pruning step 390, and therefore not considered in subsequent steps, such as the merging operation of the merge step 420. The heuristic of the small feature pruning step 390 examines all the edge-based regions of the greyscale image that amanate from the blob boundaries of the segmented image. If the area of the largest edge-based region is significantly larger (e.g., five times larger) than the area of the next largest edge-based region, then a bounding box measurement is made of the smaller region. If the smaller region does not exceed minimum length or width threshold values, and the projection of the smaller region along the long axis of the larger region is within the bounds of the larger region, the smaller region is deemed to be pruned from further consideration. It should be noted that the threshold values can be functions based on the relative size of the larger mark. For example, if the larger mark is tall (length>width), then the height threshold for the smaller mark is 10+0.4*(length−width). If the larger mark is wide (length<width), then the width threshold for the smaller mark is 10+0.4(width−length).

Figure 8:
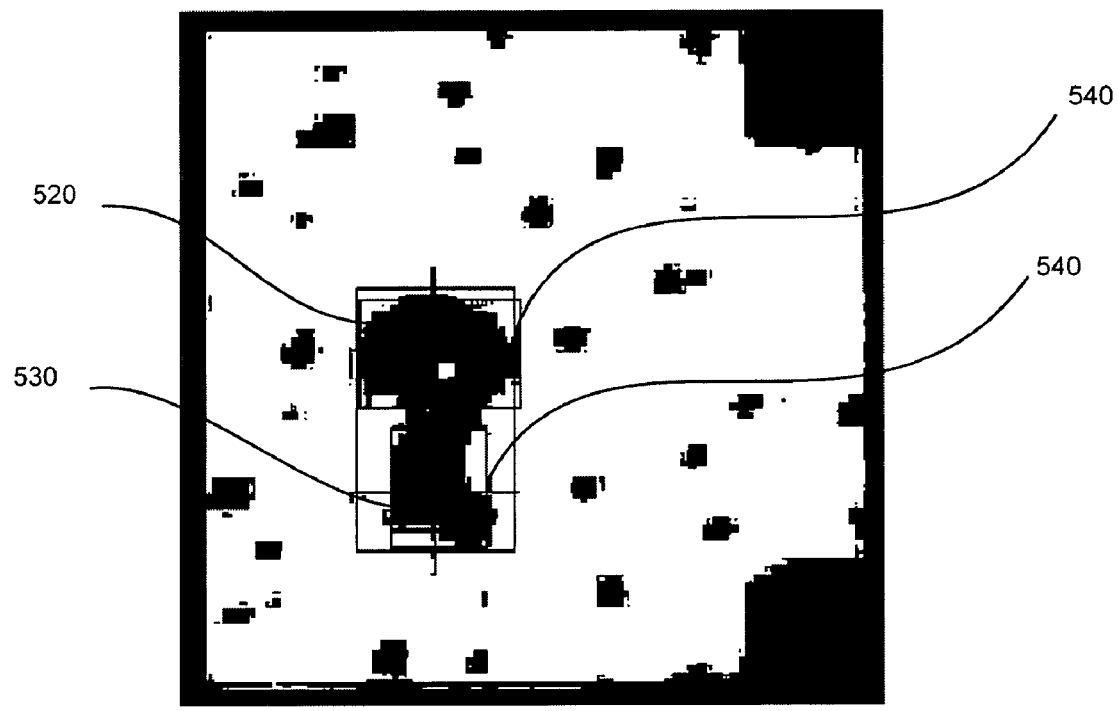
FIG. 8 is an illustration of image data produced in accordance with the exemplary embodiment of the invention.

A heuristic bifurcated region merge step 400 is applied to a probe mark comprising a disconnected region that is partially elliptical, and bifurcated in potentially two regions, as illustrated in FIG. 8. A probe mark 190 may appear as a partially elliptical top region 520 and a randomly shaped region 530 on the bottom. The purpose of this heuristic bifurcated region merge step 400 is to ensure that part of the probe mark 190 is not mischaracterized as pad surface contamination 180 as previously discussed and illustrated in FIG. 2c.

Partial elliptical top regions 520 can be identified by analyzing the regions in the image for which an ellipse may be fit on only the top (or respectively, bottom, left, or right) position. This is performed by enclosing each region with a bounding box 540 to determine the extremal boundary points. For each candidate bounding box 540, all contiguous boundary sub-curves that start or end at an edgelet having an extremal ordinate (i.e., leftmost, rightmost, topmost, or bottommost) are considered. For each sub-curve, an ellipse is fit and the error calculated. If the fit ellipse error is less than a threshold, and there exists another region in the direction that the fit ellipse opens, then the two regions may be merged.

Figure 9:
FIG. 9 is an illustration of image data produced in accordance with the exemplary embodiment of the invention.

A heuristic identification step 410 is applied to polygonal pads to account for the possibility that straight features may be visible, such as circuit traces intentionally routed on a portion of the pad, as illustrated in FIG. 9. The straight features 570 must not be confused with a probe mark, and its rectilinear shape facilitates identification and consideration. The boundaries in the segmented image are separated into four equally sized contiguous sub-boundaries, with a line fit to the associated edgelet sets. Any lines having a RMS (root mean square) fit error exceeding a threshold (e.g., 0.3 pixels) may be ignored. Pairs of lines having a RMS fit error less than the threshold (e.g., 0.3 pixels) are considered.

It may be noted that an additional length threshold may be applied to only consider regions exceeding the length threshold, so that marks having smooth, parallel sides are not mischaracterized as a straight feature 570. Line pairs having a separation less than a separation threshold (e.g., 8 pixels), will be identified as a straight line feature 570, and pruned from further consideration.

It is common that two edge chains for a single mark will be produced during edge detection of the edge detection step 350, that must be merged in the merger step 420. Edge-chain defined marks are candidates for merge when they possess similar shape, and width and height dimensions. It is possible that a single edge bisects a blob boundary region into two distinct edge-chain defined marks (i.e., one region will lack a detected edge facing its disassociated region). Additionally, the partially elliptical bifurcated region groups identified in step 400 are identified as merge candidates.

The merge operation of the merge step 420 may be comprised of several sequential heuristics that identify conditions where pairs of regions are not merged. If none of the conditions are satisfied, the pairs of regions are thus merged.

First, all pairs of marks where at least one of the pairs has an area greater than or equal to a minimum probe mark size threshold are identified. A direction between the two marks is determined by calculating a vector between the boundary center of mass of each mark in the pair. If one of the marks is elongated, and larger than the other, and the smaller mark projects to the interior of the larger mark when projected along the larger mark's elongation axis, the pair is not merged. If the closest pair of edges is separated by greater than 6 pixels, the two regions are not merged. Considering the path from the center of mass of one mark to the closest edge feature on the other mask (and a small number of parallel paths to the left and to the right of this path, 4 paths to the left spaced 0.5 pixels apart, and 4 paths to the right spaced 0.5 pixels apart). If all of the paths pass through at least one light pixel in the segmented image, i.e., a pixel with a greylevel exceeding the segmentation threshold, the marks are not merged.

When considering the merge of a partially elliptical bifurcated region identified in the bifurcated region merge step 400, the following heuristics are applied. For all marks paired to the partially elliptical region 520 that exceed the minimum probe mark size threshold, a direction is determined by calculating a vector between the center of mass for each mark. If the two marks are sufficiently separated, e.g., the distance between the two masks is greater than 2 pixels measured relative to the normal direction between them, the pair is not merged. If the distance between a bounding box individually surrounding each mark is greater than zero, the two regions are not merged. If these conditions are false, and the center of mass for each mark is within two pixels on either the horizontal or vertical axes, and if the ellipse fit to the top extremal portion of the blob boundary of the partially elliptical top region 520 is open towards the other region, the pair of marks is merged.

If any regions are merged in the merge step 420, steps enumerated 350 through 420 are repeated using the merged regions, as indicated in the repeat step 430. Any edge chains within the merged regions are appended to the list of edge chains that are rescinded from consideration as a closed chain, as described in the snapping step 360. Finally, all marks are validated by comparing the area of each mark to an area threshold (supplied by the user, nominally, 100 square pels). Marks not exceeding this threshold are disregarded.

A return data step 440 returns the probe mark characteristics, in the form of edge data from the greyscale image. Alternatively, output from the return data step 440 may be data in the form of a blob scene description of the detected probe mask, including topological and geometric features.

Figure 10:
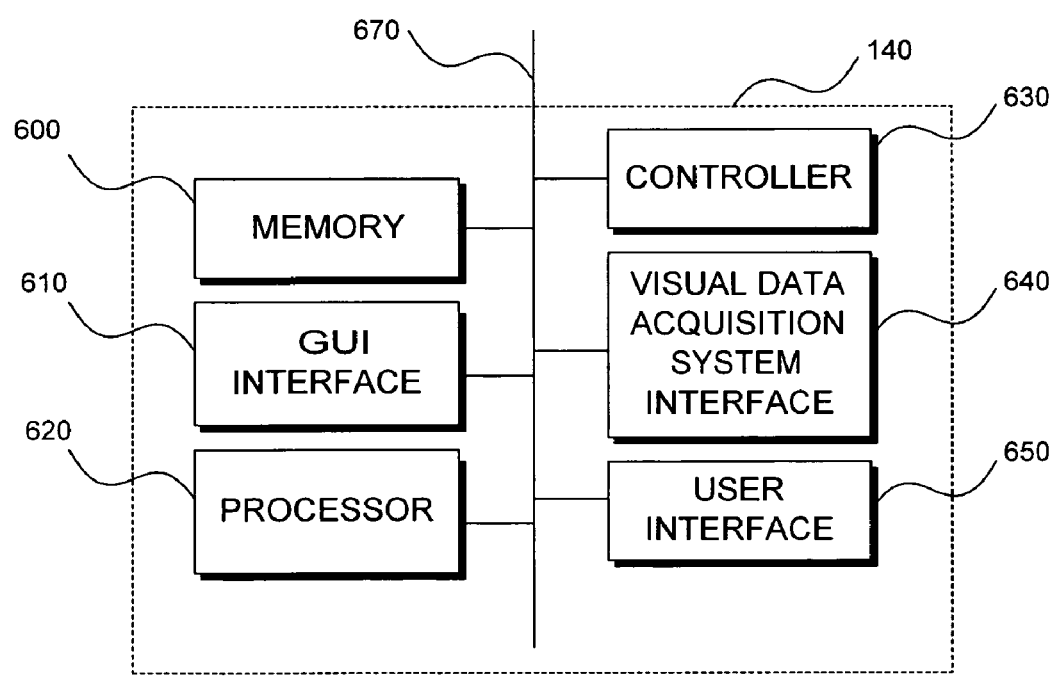
FIG. 10 is a functional block diagram of one implementation of the machine vision system 140 illustrated in FIG. 1.

FIG. 10 is a functional block diagram of one implementation of the machine vision system 140 illustrated in FIG. 1. As shown in FIG. 10, the machine vision system 140 may include a processor 820, a memory 800, a controller 830, a visual data acquisition system interface 840, a user interface 850, a GUI interface 810. A communication/data/control bus 870 couples these elements together and allows for cooperation and communication between those elements.

The memory 800 may be preferably implemented with a sufficient quantity of RAM, for example, 64 megabytes. The processor 820 may be implemented in a dual processor configuration.

The visual data acquisition system interface 840 may include both hardware and software to allow the machine vision system 140 to communicate with a visual data acquisition system, which may include, for example, a camera 120 illustrated in FIG. 1.

The Processor 820 works in cooperation with the controller 830 to control operation of the other elements 800, 810, 840, 850 and 870. In cooperation with the controller 830, the processor 820 may fetch instructions from memory 800 and decode them, which may cause the processor 820 to transfer data to or from memory 800 or to work in combination with the user interface 850 (for example, to input or output information), the visual data acquisition system 840 (for example, to input image data from or output instructions to the visual data acquisition system), and/or the GUI interface 810 (for example, to provide inspection information to the user), etc.

The controller 830 operates to control operation of the other elements 800, 840, 850, and 870 of the machine vision system 140. It should be appreciated that the controller 830 may be implemented with the processor 820, for example, in a central processing unit, or similar device.

The user interface 850 may include, for example, hardware and software for cooperating with the user or processes associated with the invention, including, a display, keyboard, and mouse. The user interface 850 may operate in conjunction with the processor 820 and controller 830 to allow a user to interact with software programs stored in the memory 800 and used by the processor 820 so as to perform the operations illustrated in FIG. 5.

The machine vision system 140 can be implemented, for example, as portions of a suitably programmed general-purpose computer. The system may be implemented, for example, as physically distinct hardware circuits within an ASIC. The particular form of the machine vision system 140 can be different. For example, although the machine vision system 140 has been described as a general purpose computer, of example, a personal computer, it is foreseeable that the machine vision system 140 may be a special purpose embedded processor.

While the invention has been described with reference to the certain illustrated embodiments, the words which have been used herein are words of description, rather than words of limitation. Changes may be made, within the purview of the appended claims, without departing from the scope and spirit of the invention in its aspects. Although the invention has been described herein with reference to particular structures, acts, and materials, the invention is not to be limited to the particulars disclosed, but rather extends to all equivalent structures, acts, and materials, such as are within the scope of the appended claims.

What is claimed is:

1. An image data analysis method for inspecting pads of electronic devices, the method comprising:
    acquiring an image corresponding to a pad;
    generating binarized image data from the image;
    generating a list of dark regions from the binarized image;
    selecting at least one dark region from the list of dark regions;
    generating edge data by performing edge detection on a portion of the image corresponding to the at least one dark region;
    positioning a geometric mask at a plurality of mask positions tangent to the edge data;
    pruning the at least one dark region of at least a portion of the binarized image data not contained by the mask position; and
    computing a boundary description of the at least one dark region using the binarized image data and the edge data.

2. The image data analysis method of claim 1 wherein the geometric mask is circular.

3. The image data analysis method of claim 1 further comprising the application of a fuzzy threshold according to an aspect ratio of the at least one dark region for limiting the pruning step.

4. An image data analysis method for inspecting pads of electronic devices, the method comprising:
    acquiring an image corresponding to a pad;
    generating binarized image data from the image;
    generating a list of dark regions from the binarized image;
    selecting at least one dark region from the list of dark regions;
    generating edge data by performing edge detection on a portion of the image corresponding to the at least one dark region;
    generating a first elliptical representation of an extremal end of the at least one dark region;
    generating a second elliptical representation of a subset of the edge data corresponding to a region adjacent to both sides of the extremal end of the at least one dark region;
    generating a third elliptical representation of the edges used in the first and second elliptical representations;
    pruning the at least one dark region in response to a comparison of the first elliptical representation, the second elliptical representation and the third elliptical representation; and
    computing a boundary description of the at least one dark region using the binarized image data and the edge data.

5. The image data analysis method of claim 4 wherein the step of pruning the at least one dark region further comprises:
    calculating a fit error of the first elliptical representation and a fit error of the second elliptical representation and a fit error of the third elliptical representation; and
    pruning the at least one dark region using the elliptical representation having a minimum fit error.

6. An image data analysis system comprising:
    a camera;
    a machine vision processor coupled to the camera, the processor and the camera configured to acquire an image corresponding to a region of the inspection;
    means for generating binarized image data from the image;

means for generating a list of dark regions from the binarized image data;

means for selecting at least one dark region from the list of dark regions;

means for generating edge data by performing edge detection on a portion of the image corresponding to the at least one dark region;

means for heuristic refinement of the binarized image data and the edge data; and means for computing a boundary description of the at least one dark region using the binarized image data and the edge data;

means for positioning a geometric mask at a plurality of mask positions, the mask positions tangent to the edge data in the image; and means for pruning the at least one dark region of at least a portion of the boundary description not contained by the mask positions.

7. The system of claim 6 further comprising a means for applying a fuzzy threshold according to an aspect ratio of the at least one dark region for limiting the pruning means.

8. An image data analysis system comprising:
means for acquiring an image corresponding to a region of inspection;
means for generating binarized image data from the image;
means for generating a list of dark regions from the binarized image data;
means for selecting at least one dark region from the list of dark regions;
means for generating edge data by performing edge detection on a portion of the image corresponding to the at least one dark region;
means for generating a first elliptical representation of an extremal end of the at least one dark region;
means for generating a second elliptical representation of a subset of the edge data corresponding to a region adjacent to both sides of the extremal end of the at least one dark region;
means for generating a third elliptical representation of the edges used in the first and second elliptical representations; and
means for pruning the at least one dark region in response to a comparison of the first elliptical representation, the second elliptical representation and the third elliptical representation; and
means for computing a boundary description of the at least one dark region using the binarized image data and the edge data.

9. The system of claim 8 further comprising:
means for calculating a fit error of the first elliptical representation and a fit error of the second elliptical representation and a fit error of the third elliptical representation, and;
means for pruning the at least one dark region using the elliptical representation having a minimum fit error.

10. An image data analysis method for inspecting scenes, the method comprising:
acquiring an image of a scene;
generating binarized image data from the image;
generating a list of dark regions from the binarized image;
selecting at least one dark region from the list of dark regions;
generating edge data by performing edge detection on a portion of the image corresponding to the at least one dark region;
positioning a geometric mask at a plurality of mask positions tangent to the edge data;
pruning the at least one dark region of at least a portion of the binarized image data not contained by the mask positions; and
computing a boundary description of the at least one dark region using the binarized image data and the edge data.

11. The image data analysis method of claim 10 wherein the geometric mask is circular.

12. The image data analysis method of claim 10 further comprising the application of a fuzzy threshold according to an aspect ratio of the at least one dark region for limiting the pruning step.

13. An image data analysis method for inspecting scenes, the method comprising:
acquiring an image of a scene;
generating binarized image data from the image;
generating a list of dark regions from the binarized image;
selecting at least one dark region from the list of dark regions;
generating edge data by performing edge detection on a portion of the image corresponding to the at least one dark region;
generating a first elliptical representation of an extremal end of the at least one dark region;
generating a second elliptical representation of a subset of the edge data corresponding to a region adjacent to both sides of the extremal end of the at least one dark region;
generating a third elliptical representation using the edged from the first and second elliptical representations; and
pruning the at least one dark region in response to a comparison of the first elliptical representation, the second elliptical representation, and the third elliptical representation; and
computing a boundary description of the at least one dark region using the binarized image data and the edge data.

14. The image data analysis method of claim 13 wherein the step of pruning the at least one dark region further comprises:
calculating a fit error of the first elliptical representation and a fit error of the second elliptical representation and a fit error of the third elliptical representation; and
pruning the at least one dark region using the elliptical representation having a minimum fit error.

* * * * *